United States Patent [19]
Coop et al.

[11] 3,808,595
[45] Apr. 30, 1974

[54] CHAFF DISPENSING SYSTEM

[75] Inventors: William Henry Coop, Torrance; Robert Dale Christian; John Stiles Gaffney, both of Santa Ana, all of Calif.

[73] Assignee: Celesco Industries Inc., Costa Mesa, Calif.

[22] Filed: Apr. 11, 1973

[21] Appl. No.: 349,968

[52] U.S. Cl. ............................. 343/18 E, 343/18 B
[51] Int. Cl. ............................................. H04k 3/00
[58] Field of Search ....................... 343/18 B, 18 E

[56] References Cited
UNITED STATES PATENTS

| | | | |
|---|---|---|---|
| 3,761,929 | 9/1973 | Wyatt | 343/18 E X |
| 3,626,415 | 12/1971 | Montgomery | 343/18 E |
| 3,518,670 | 6/1970 | Miller | 343/18 E |
| 2,871,344 | 1/1959 | Busignies | 343/18 B |

*Primary Examiner*—Malcolm F. Hubler
*Attorney, Agent, or Firm*—Tipton D. Jennings

[57] ABSTRACT

The embodiments of the chaff dispensing system disclosed in the present application use a slurry of Freon and chaff particles and thus permits hydraulic and pneumatic principles to be readily employed to ease the handling and dispensing of the chaff. The flow rate of the slurry can be precisely controlled to obtain chaff clouds of desired densities. Once the slurry is dispensed into the atomsphere at altitude, the highly volatile Freon vaporizes so that it does not adversely affect the formation of a cloud by the chaff particles. The Freon and chaff particles have substantially the same density to minimize settling or separation by the action of gravity, and the particles will thus remain distributed evenly in the slurry.

11 Claims, 4 Drawing Figures

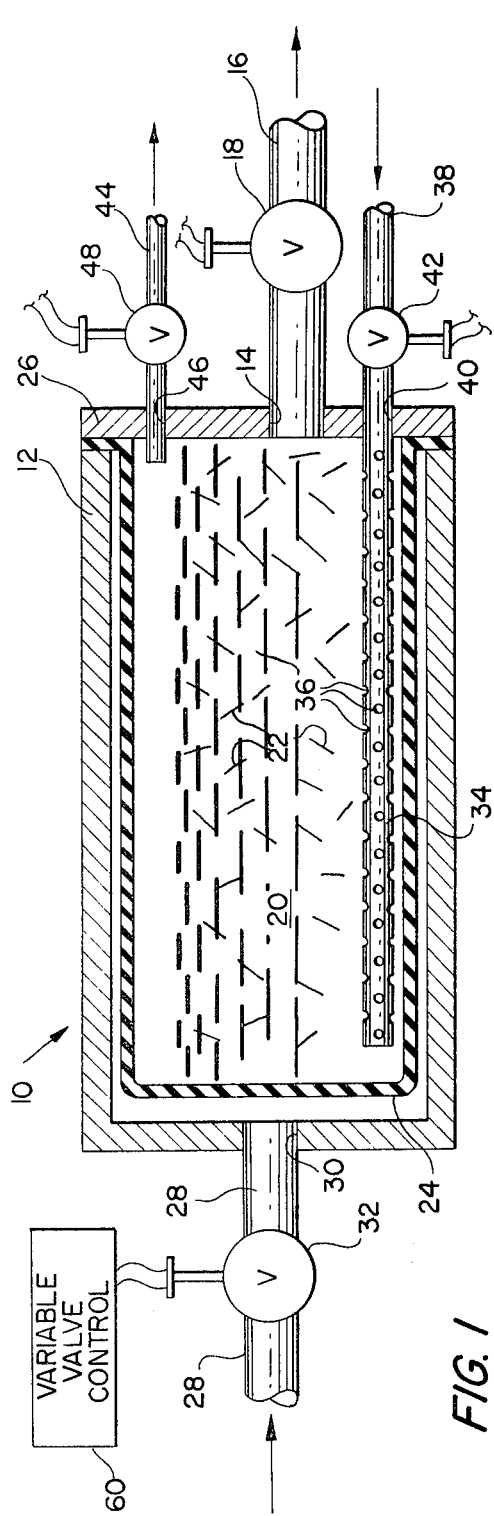
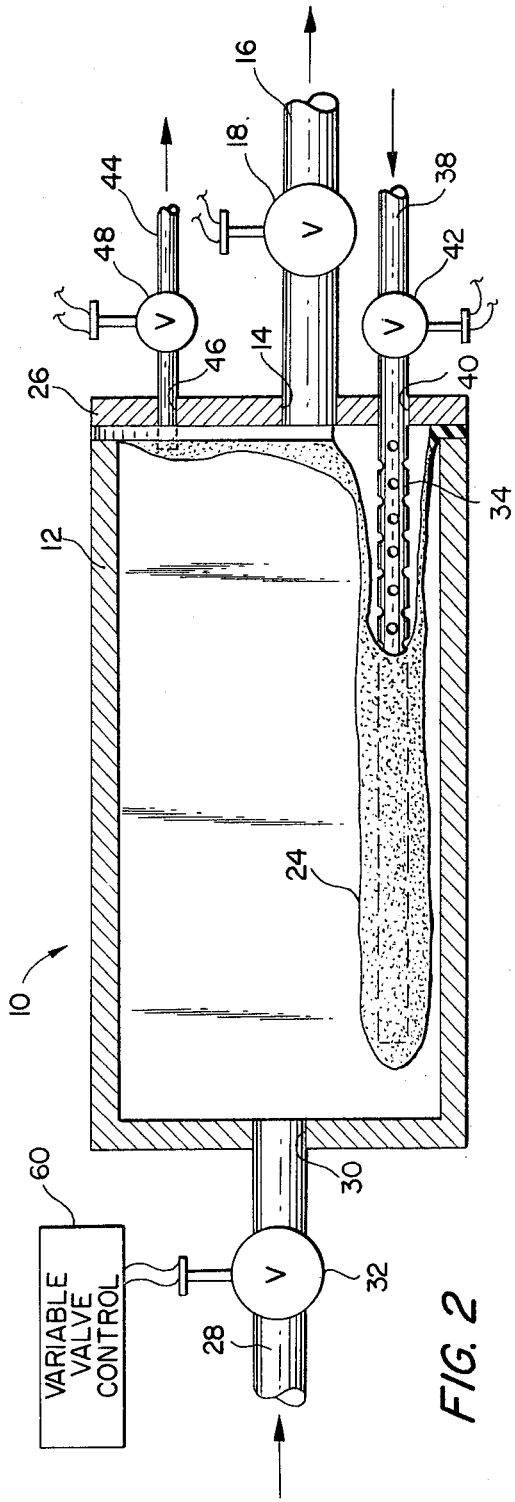

CHAFF DISPENSING SYSTEM

BACKGROUND OF THE INVENTION

The present invention relates to a system for dispensing radar reflective particles particularly suitable for use with airborne vehicles, such as aircraft, gliders, missiles, and the like, and to a novel slurry used in such system.

Since almost the invention of radar, it has been known that small particles of conductive material dispensed as a cloud into the atmosphere inhibit radar. This material is most commonly dispensed by airborne craft to confuse or saturate ground or airborne radar, but also has other uses such as in radar tracking practice.

This conductive material reflects microwave energy and is commonly called chaff. It is formed as narrow conductive strands or strips which act as resonant dipoles at the radar frequency. When these dipoles are dispensed in sufficient numbers, the resulting cloud produces a radar cross section comparable to that of an aircraft and sufficient to block radar discrimination of aircraft. The individual dipoles of the chaff are typically 1/32 to 1/8 inch wide and of a length equal to approximately one-half wavelength at the radar frequency. The long development and use of conventional chaff has resulted in an efficient product which can readily produce the desired total radar cross section.

A number of techniques have been employed in the past for dispensing a body of chaff from a container. One such dispenser employs a gas-generating pyrotechnic which, when ignited, generates gas to expel the radar chaff from the container. One of the problems with this approach is that the ejection of the fragile strips from a high-speed aircraft produces a violent agitation during deceleration which can result in severe damage to the individual chaff particles. Also, the particles might become burned by pyrotechnic detonations or become wadded so that they fall to the ground in a lump when ejected. One solution proposed has been to tie the chaff together in a paper bundle which separates from the chaff following ejection. However, the chaff bundle is then concentrated in a small volume and its distribution into a wide cloud by natural spreading and wind currents is relatively slow.

Another prior-art approach is shown in U.S. Pat. No. 3,626,415 in which a module holding the chaff is ejected as a unit. A flexible membrane lines the interior walls of the module, and a gas generator is placed underneath the membrane. The gas generator is timed to function after the module case has decelerated to a speed at which the chaff may be softly expelled. The generated pressure forces the membrane outward, completely inverting it and expelling the chaff. While this approach has solved some of the problems, it has resulted in a smaller payload of chaff since a greater volume of the chaff housing must be occupied by the individual modules and the gas generator in each module.

U.S. Pat. No. 3,222,675 discloses a sublimation process for releasing chaff in a belt about the earth. While this provides a controlled release of the dipoles, it is obviously intended to be a slow process. Other patents such as U.S. Pat. No. 3,068,472 and U.S. Pat. No. 3,519,221 show the use of blowers for aiding in the ejection of chaff.

SUMMARY OF THE INVENTION

The chaff dispensing system and method of the present invention permits the rapid dispensing of a large volume of chaff in a short interval of time with rapid chaff cloud formation and minimal damage to the chaff particles. The chaff is suspended in a liquid having substantially the same density as that of the chaff and the liquid is selected to be highly volatile so that it quickly vaporizes after dispensing and does not adversely affect the chaff cloud formation. The use of a liquid/chaff slurry permits hydraulic and pneumatic principles to be employed in the handling and dispensing of the chaff. Preferably, the dispensing of chaff and the resulting cloud coverage can be controlled by controlling the flow rate of the slurry. For example, where chaff is to be used as an electronic countermeasure, the flow rate can be selected for the desired cloud area and density and thereby provide either saturation or shielding coverage.

In accordance with the purposes of the invention, as embodied and broadly claimed herein, the system of this invention comprises a container having an aperture, a dispersion contained within said container, said dispersion including radar reflective particles in a liquid carrier, a movable member having two sides, one side of which is in contact with said dispersion, and means for applying pressure to the opposite side of said movable member to cause movement thereof and the ejection of said dispersion through said aperture.

In accordance with the purposes of the invention, as embodied and broadly described herein, the novel slurry used for making chaff clouds comprises radar reflective strands suspended in a liquid carrier non-reactive with said strands, said liquid carrier and said strands having substantially the same density, said liquid carrier being highly volatile upon release into the atmosphere under use conditions, and said strands being electrically conductive and comprising metals, metal-coated non-conductors, or metallized non-conductors.

Preferably, the rate of flow of the dispersion or slurry can be varied in order to obtain a chaff cloud of a desired density.

It is also preferred that the movable member be a flexible bladder that responds to the applied pressure to force the slurry from the container.

The invention consists in the novel apparatus, constructions, arrangements, combinations, processes, and improvements shown and described. The accompanying drawings, which are incorporated in and constitute a part of the specification, illustrate an embodiment of the invention and, together with the description, serve to explain the principles of the invention.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 1 is a schematic embodiment of an improved chaff dispensing system constructed in accordance with the teaching of this invention;

FIG. 2 is a schematic of FIG. 1 with the bladder in a collapsed position;

DESCRIPTION OF THE PREFERRED EMBODIMENTS

Figure 3:
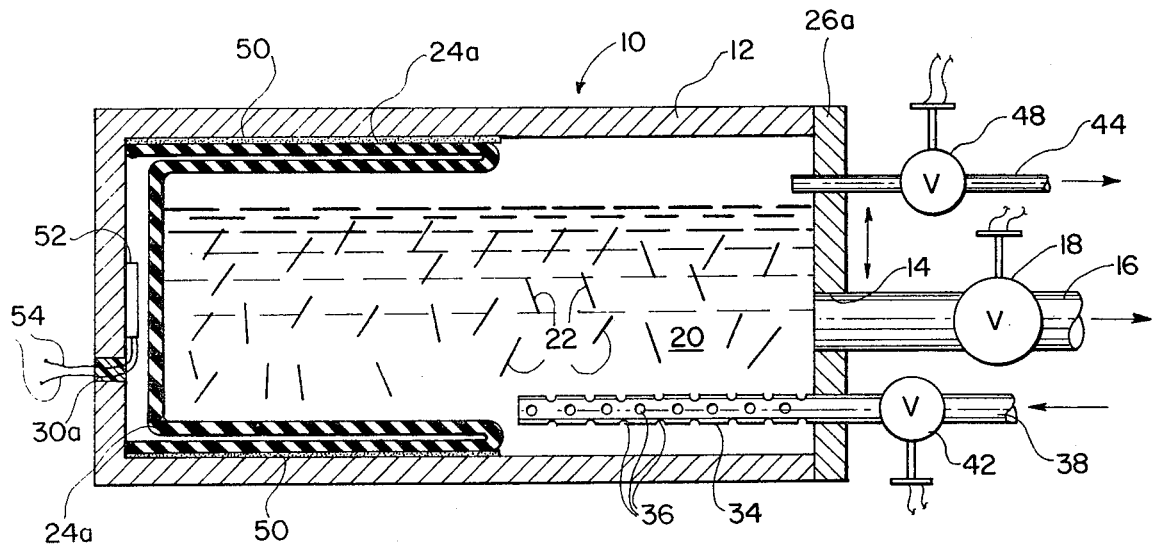
FIG. 3 is an alternative schematic embodiment of an improved chaff dispensing system constructed in accordance with the teaching of this invention.
Figure 4:
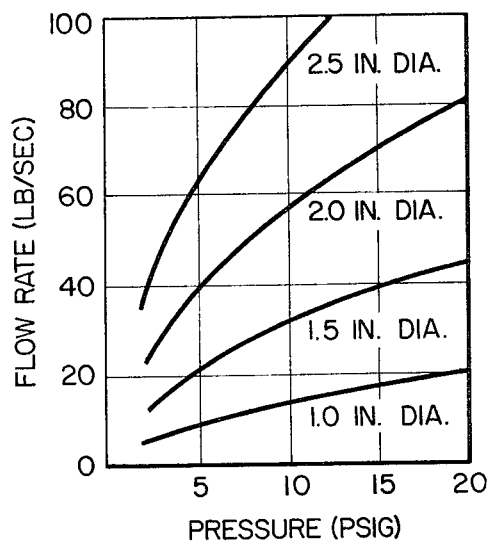
FIG. 4 is a graph depicting slurry flow rates vs. applied pressure for several ejection aperture sizes.

Reference will now be made in detail to the present preferred embodiments of the invention, examples of which are illustrated in the accompanying drawings.

Referring now to the drawings, and particularly to FIG. 1, there is shown a schematic embodiment of a chaff dispensing system 10 which can be transported by an airborne vehicle, such as an aircraft, glider, rocket, missile, or the like, so that the radar reflective particles in the system can be dispensed aloft when desired.

In accordance with the invention, the system includes a container 12, shown here as being preferably of a cylindrical shape but which can obviously include other shapes. An aperture 14 is formed at the exit end of the container 12 to serve as a port for the ejection of the contents of the container, as later explained. As here embodied, a line or pipe 16 is connected to aperture 14 to transport the contents of container 12 upon ejection. A valve 18 is placed in line 16 to control the flow through such line.

In accordance with the invention, a dispersion is contained within the container 12, such dispersion comprising radar reflective particles in a liquid carrier. As here embodied, the dispersion is formed as a slurry 20 of numerous particles, partly identified here by the numeral 22, dispersed in a liquid carrier. The particles 22 consist of dipole strips called chaff, as discussed hereinabove.

In accordance with the invention, there is provided within the container 12 a movable member having two sides, one side of which is in contact with dispersion 20. As here embodied, the movable manner is a flexible bladder 24 which lines the inside walls of the container 12 and is cup-shaped with its open end sealed to the container 12 by any suitable means to prevent the leakage of slurry 20. Preferably, the slurry 20 is contained inside bladder 24. The end plate 26 of the container 12 is depicted as removable to permit the rim of bladder 24 to be placed and sealed between the underside of plate 26 and the sidewall of the container 12. The bladder 24 is made of any suitable material which is non-reactive with the ingredients of slurry 20. If necessary or desirable, bladder 24 can completely encase the slurry. In such case, the bladder is provided with an exit aperture aligned with aperture 14.

In accordance with the invention, means are provided for applying pressure to the opposite side of the movable member to cause movement thereof and the ejection of the dispersion through the aperture 14. As here embodied, the flexible bladder 24 is designed to be collapsed by the application of gas pressure to its outside surface so that the slurry 20 is forced out of aperture 14 under the applied pressure. In FIG. 1, the pressure applying means is embodied as a pipe or line 28 which communicates with the interior of container 12 and thereby the exterior surface of bladder 24 through a second aperture 30 formed in the container 12. A valve 32 controls the application of pressurized gas from a gas source. As examples, the gas source can be a pyrotechnic gas generator, a tank of compressed air, an air compressor, or ram air resulting from movement of the airborne vehicle carrying the dispenser 10.

As noted above, the slurry 20 is a dispersion of chaff particles 22 in which the chaff particles are distributed essentially evenly throughout the carrier. Similar densities for the chaff and the liquid slurry are essential to ensure that the chaff remains in suspension for as long a time as possible. In a mixture of particles and slurry, the settling action is caused primarily by gravity. If both materials have the same density, the gravitational force is the same on both; therefore, there is no relative separation force between the two materials and the particles remain distributed evenly in suspension in the slurry.

In the event settling should occur during storage, handling or flight, a manifold 34 is preferably immersed within the slurry to provide for agitation of the slurry prior to its dispensing. The manifold 34 is here shown to be an elongated hollow pipe having a plurality of holes 36 formed therein throughout its length. The manifold is connected to a gas line 38 through a third aperture 40 formed in the container 12. Line 38 supplies agitation gas under pressure to the manifold, and this gas is diverted into the slurry via holes 36 to agitate or stir the slurry and maintain equal distribution of the chaff particles. Application of the gas is under the control of valve 42 positioned in line 38. A vent line 44 for the agitation gas communicates with the interior of the bladder 24 through a fourth aperture 46 formed in the container 12. A valve 48 controls the opening and closing of vent line 44.

Prior to dispensing, valve 42 is opened and agitation gas is injected into slurry 20 via the holes 36 in the manifold to thoroughly mix the chaff 22 and the liquid carrier. Valve 48 is then opened briefly and the agitation gas is vented from the container 12 through line 44. After agitation is completed and valves 42 and 48 have been closed, valve 32 is opened to admit pressurized gas into container 12. Valve 18 is also opened to provide an exit path for the slurry 20. The buildup of pressure within container 12 acts upon the exterior surface of bladder 24 causing it to begin collapsing. The pressure on the bladder is transferred to the slurry and the latter is ejected from the container 12 through aperture 14 and the line 16 and enters the atmosphere to form the external chaff cloud.

As the pressurized gas continues to be applied through the line 28, the slurry continues to be dispensed from container 12. Dispensing can be terminated at any time by closure of valves 18 and 32. If it is desired to dispense all of the slurry 20 from the container, then the pressurized gas is applied to container 12 until the bladder is completely collapsed as shown in FIG. 2. At such time virtually all of the slurry has been dispensed from the container 12.

As the slurry enters the atmosphere, the chaff particles are momentarily confined within the liquid carrier and thus they are subjected less to the violent agitation during deceleration that is encountered when the chaff particles are individually ejected from a high-speed aircraft. The liquid carrier is selected to be highly volatile under use conditions and thus evaporates upon exposure to the atmosphere. The numerous chaff particles are left, free of any confining liquid, in a trail either behind, below, or above the transporting vehicle to form the desired cloud.

An alternative embodiment of the dispensing system is shown in FIG. 3. As here embodied, the bladder **24*a* has its forward portion folded back and sealed to the inside of container 12 by adhesive, heat-sealing, or any other suitable means. This seal is depicted by numeral 50 and preferably extends about the entire peripheral surface of the bladder 24*a* from the point of the fold to the front of container 12. In this manner, the slurry 20 is prevented from seeping between the folded-back portion of the bladder and the inside of the container. When the slurry is loaded into container 12**, it comes in contact with both the exposed inside surface of the bladder and interior surface of the container. If necessary, the contacted surfaces of the container can be lined with an inert coating to prevent reaction with the ingredients of the slurry.

The remainder of the apparatus schematically depicted in FIG. 3 is essentially the same as in FIG. 1, except that an alternative pressure-applying means is portrayed. As here embodied, this means includes a gas generator 52, which may be a pyrotechnic composition, mounted on the inside front surface of the container 12. Electric leads 54, or alternatively a fuse, is connected to an activating means (not shown) through a sealed aperture **30*a* formed in the container. If necessary, a grill or similar shield (not shown) can be placed over the gas generator 52 to protect the outer surface of bladder 24*a* during combustion. When it is time to dispense the slurry 20, the gas generator 52 is ignited and valve 18 in the exit line 16 is opened. The gas generating pyrotechnic begins to burn and the evolved gas creates pressure against the bladder 24*a*. Under this applied pressure, the bladder begins to move to the right, as viewed in FIG. 3, in an unfolding manner and expels the slurry from the container through aperture 14. Dispensing is complete when the bladder has been completely unfolded under the pressure of the gas and lines essentially the entire inside surface of the container 12**.

In both embodiments, the rate of flow of the slurry from the container 12 is controlled by the size of the exit orifice 14 and the pressure of the expulsion gas. The flow rate, of course, will determine the quantity of the slurry dispensed. Assuming a constant loading density of chaff particles in the liquid carrier and a constant vehicle altitude and velocity, the flow rate determines the density of the resulting chaff cloud. As should be clear from the preceding description, a main advantage to using a liquid carrier is that it provide a mechanism for dispensing chaff that is readily controllable. Hydraulic and pneumatic techniques can thus be readily employed to ease the handling and dispensing of the chaff.

In accordance with the invention, there are means provided for varying the rate of flow of the dispersion from the container 12. As embodied herein and with reference to FIG. 1 again, there are means shown for controlling the pressure of the gas applied to the opposite side of the movable member. Preferably, this controlling means includes a variable valve control 60 by which the flow of pressurization gas through line 28 into chamber 12 is controlled. By controlling the mass of pressurization gas which is admitted into chamber 12, the pressure on bladder 24 is controlled and thus the flow rate can be adjusted to obtain a chaff cloud of the desired density.

An alternative embodiment of the flow rate varying means is presented schematically in FIG. 3 as a variable orifice 14. As here embodied, end plate **26*a* is shown as having a movable slide which can be positioned to select the desired size for orifice 14. In practice, it may be more feasible to have on hand a series of sized reducing inserts for the aperture 14, or a series of end plates with a variety of aperture sizes, so that the size of the aperture is preselected in this manner. As a still further alternative, aperture 14 can be fixed to one size and valve 18** either made variable or preset to open somewhere between a fully-closed and fully-opened setting to obtain the desired flow rate.

FIG. 4 shows a graph in which flow rate is plotted against pressure for four different aperture sizes. By proper selection of aperture diameter and the pressure applied to the bladder, it is seen that a desired flow rate within a wide range of flow rates can be attained. Thus, this permits the selection of a wide range of chaff cloud densities.

Although the container 12 has been schematically depicted for ease of illustration, it should now be obvious that in practice a number of equivalent structures are available. The same applies for the particular apparatus utilized with container 12. For example, it is within the scope of the invention that suitable valves other than the solenoid valves shown can be employed. Also, it should be apparent that line or pipe 16 can be positioned to exhaust the slurry in any direction desired, and can be formed as a flexible hose or incorporate a nozzle. Similarly, if it is desired to expel all of the slurry from chamber 12 at one time, it may not be necessary to use a valve 18 in line 16. Instead, a rupturable diaphragm or disc (not shown) can be used to seal aperture 14. In use, when the pressure on bladder 24 reaches a predetermined level, the diaphragm ruptures and the slurry 20 is expelled through aperture 14.

In accordance with the invention, the liquid carrier in which the radar reflective strands are suspended is highly volatile so that upon release into the atmosphere under use conditions, it immediately vaporizes leaving only the radar reflective strands. This carrier is selected to be non-reactive with the chaff particles so that they do not become decomposed or otherwise adversely affected while in contact with the carrier. As discussed previously, the density of this liquid carrier and the chaff strands is substantially the same so that the strands tend to remain uniformly distributed in the carrier during handling and dispensing. Densities within the range of approximately 0.05 pounds per cubic inch to 0.07 pounds per cubic inch have been found to be particularly suitable.

An example of a suitable liquid carrier having the foregoing properties is a Freon fluorocarbon. Certain of these fluorocarbons have a low boiling point, but those that do can be maintained in a fluid state with relatively low pressurization. Thus, if necessary in practice, the slurry can be initially pressurized in order to keep the low-boiling-point liquid in a liquid state until ejection into the atmosphere. The densities of the Freon fluorocarbon compounds vary, and a particular compound can be picked which substantially matches the density of the chaff strands. Freon 12 ($CCl_2F_2$) and Freon 21 ($CHCl_2F$) appear particularly suitable.

The altitude at which the volatile carrier is to be used must also be considered in selecting a candidate liquid. For example, if it is planned to dispense the slurry between 20,000 feet and 40,000 feet, then the selected carrier must undergo volatile boiling in that altitude range. The ambient temperatures at these altitudes will also have to be checked to insure that the selected liquid carrier will vaporize at the generally lower temperatures which will be encountered at altitude. For handling purposes, the liquid should preferably have a sea level boiling point above expected seal level ambient conditions, but as pointed out above, a fluid state can be maintained with slight pressurization if necessary.

While it is difficult to define precisely the term "highly volatile" used herein in defining a property of the liquid carrier, it should be clear from a reading of this specification that it is essential to the successful formation of chaff clouds that the liquid carrier be that type which evaporates essentially immediately upon release into the atmosphere under use conditions so that the large quantity of chaff strands which have been deployed are not weighted down by the liquid and caused to fall away following dispensing. In this manner, the desired density of the chaff cloud can be precisely tailored knowing the loading density or concentration of dipoles in the slurry and the predetermined flow rate.

The radar reflective particles or strands are well-known and can be formed of any material suitable for such use. As examples, the strand material can be a metal such as aluminum, copper, tungsten, or steel, a metallized non-conductor, or a metal-coated non-conductor such as a metal-coated plastic. The strand must be electrically conductive.

It will be apparent to those skilled in the art that various modifications and variations can be made to the present invention without departing from the scope or spirit of the invention.

What is claimed is:

1. A dispensing system for radar reflective particles comprising:
   a. A container having
      1. an aperture,
   b. a dispersion contained within said container, said dispersion including
      1. radar reflective particles in a liquid carrier,
   c. a movable member having two sides, one side of which is in contact with said dispersion, and
   d. means for applying pressure to the opposite side of said movable member to cause movement thereof and the ejection of said dispersion through said aperture.

2. A dispensing system as claimed in claim 1 further comprising:
   a. means for varying the rate of flow of said dispersion from said container.

3. A dispensing system as claimed in claim 2 wherein said varying means includes;
   a. means for controlling the pressure of the gas applied to the opposite side of said movable member.

4. A dispensing system as claimed in claim 1 wherein said dispersion is a slurry in which the solid particles and liquid carrier have substantially the same density, and the liquid carrier is highly volatile under use conditions.

5. A dispensing system as claimed in claim 4 wherein said movable member is a flexible bladder lining the inside of said container and said dispersion is contained within said bladder.

6. A dispensing system as claimed in claim 5 further comprising:
   a. a manifold immersed within said slurry, and having a plurality of holes formed therein, and
   b. means for supplying gas through said holes to agitate said slurry.

7. A dispensing means as claimed in claim 6 further comprising:
   a. means for varying the rate of flow of said slurry from said container.

8. A dispensing system as claimed in claim 7 wherein said varying means includes:
   a. means for controlling the pressure of the gas applied to the opposite side of said bladder.

9. A slurry for use in making chaff clouds comprising radar reflective strands suspended in a liquid carrier non-reactive with said strands, said liquid carrier and said strands having substantially the same density, said liquid carrier being highly volatile upon release into the atmosphere under use conditions, and said strands being electrically conductive and comprising metals, metal-coated non-conductors, and metallized non-conductors.

10. A slurry as claimed in claim 9 wherein the density is within the range of approximately 0.05 pounds per cubic inch to 0.07 pounds per cubic inch.

11. A slurry as claimed in claim 10 wherein said liquid carrier is a Freon fluorocarbon.

* * * * *